Jan. 22, 1946. R. H. KRESS 2,393,384
MEASURING AND CUTTING DEVICE
Filed Jan. 1, 1945  2 Sheets-Sheet 2
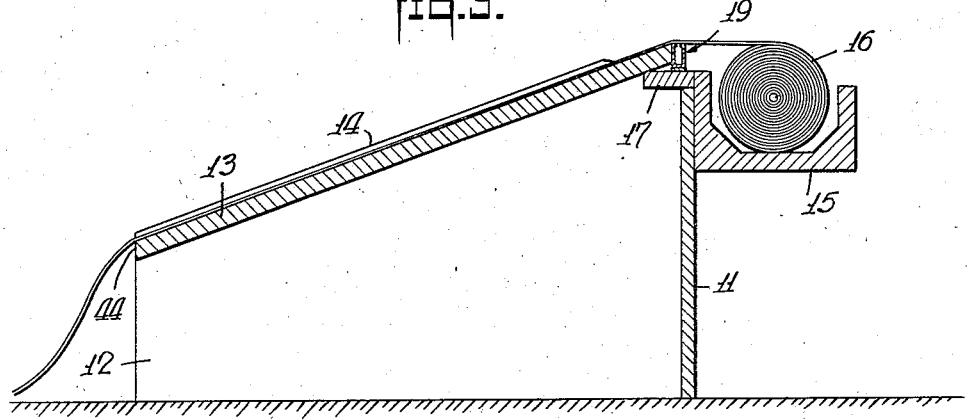
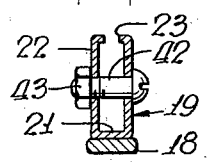
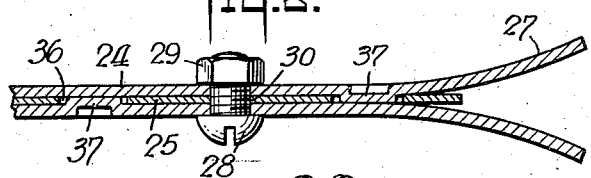
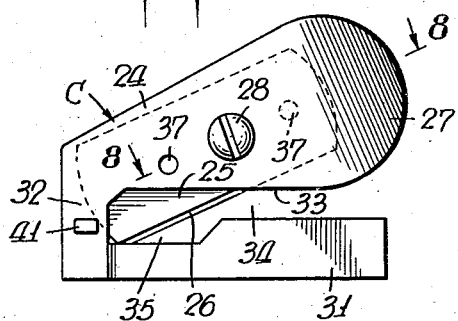
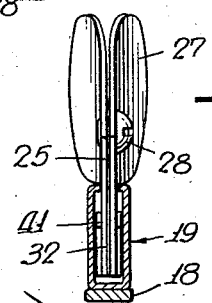
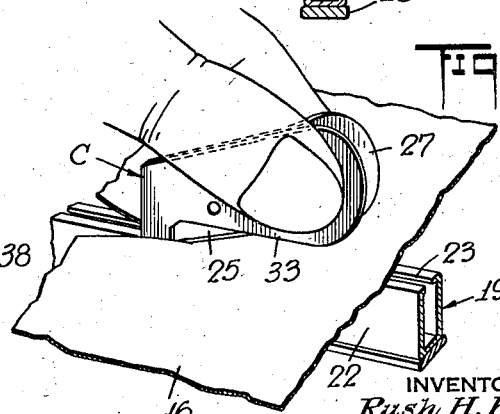
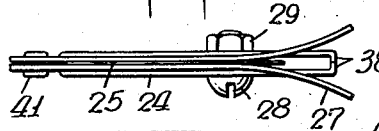
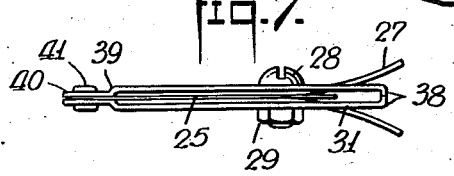
INVENTOR
Rush H. Kress
BY
Dean Fairbank & Hirsch
ATTORNEYS Patented Jan. 22, 1946

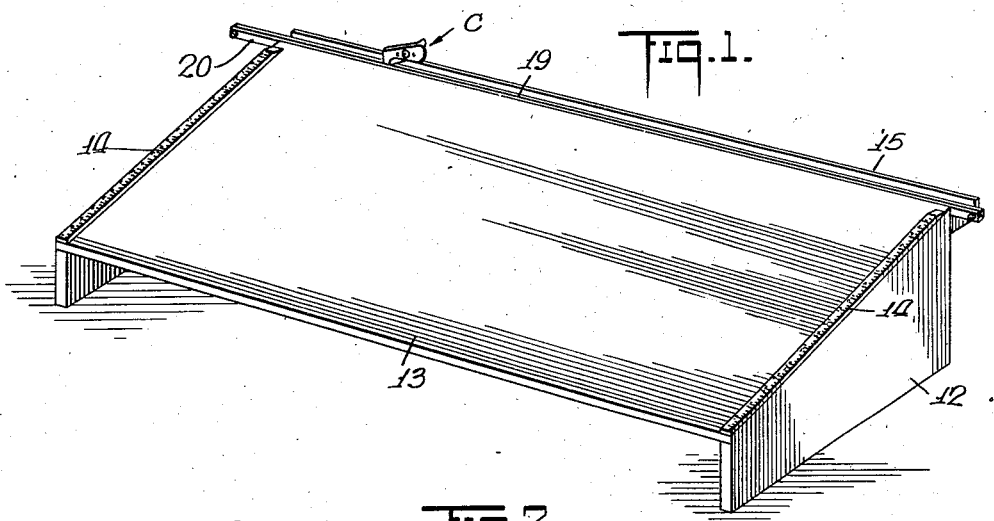
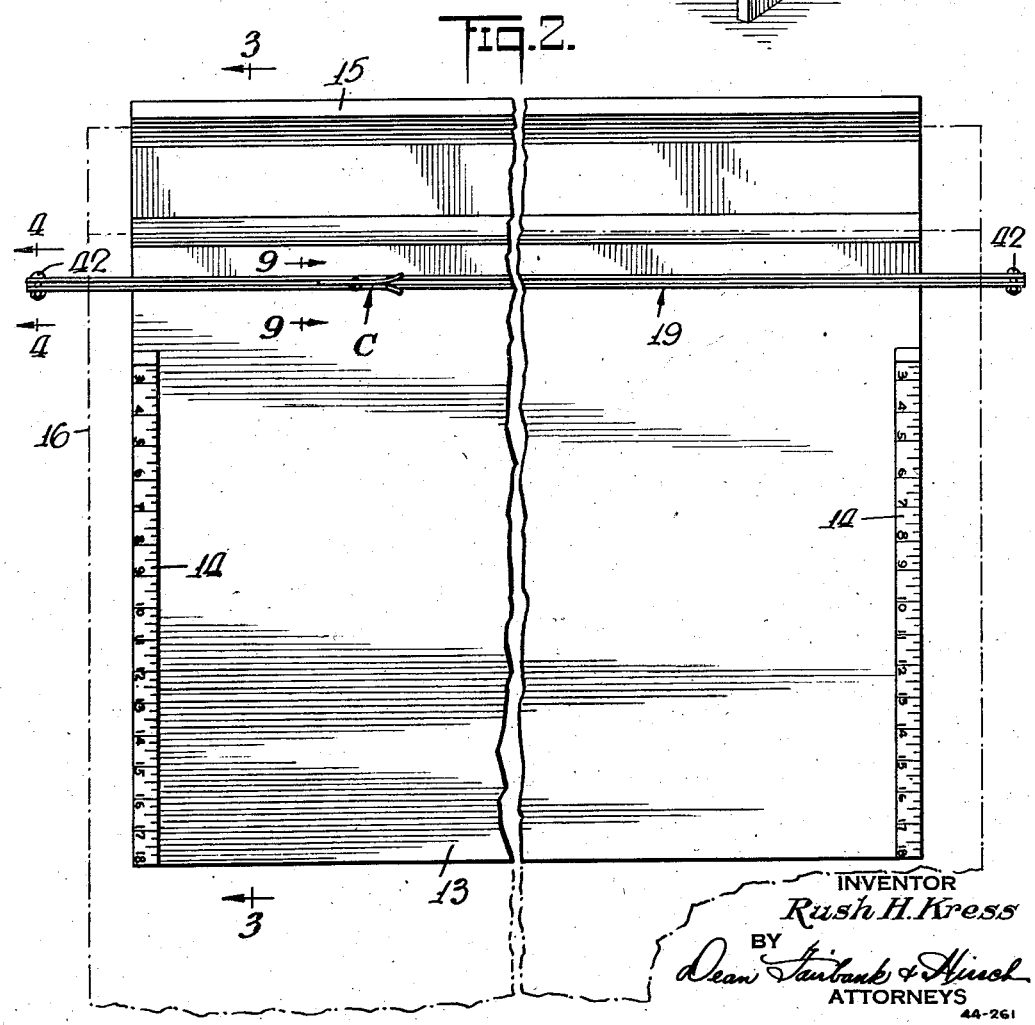

2,393,384

UNITED STATES PATENT OFFICE 2,393,384

MEASURING AND CUTTING DEVICE

Rush H. Kress, New York, N. Y.

Application January 1, 1945, Serial No. 570,989

7 Claims. (Cl. 164—73)

The present invention relates to measuring and severing devices for sheet material, and is useful more especially for the retail sale of oil cloth and the like.

It is among the objects of the invention to provide simple and inexpensive equipment, by which the sales person can measure off from a roll and sever therefrom lengths of oil cloth and the like for retail sale, and may do so expeditiously without the use of hand-held measuring rules or tapes or of separate cutting tools, or strain or danger of injury and without waste or error.

In the accompanying drawings in which is shown one of the various possible embodiments of the several features of the invention, Fig. 1 is a perspective view of the device in use, Fig. 2 is a plan view thereof, Fig. 3 is a transverse sectional view taken on line 3—3 of Fig. 2, Fig. 4 is a transverse sectional view of a detail on a larger scale taken on line 4—4 of Fig. 2, Fig. 5 is a side elevation of the knife carriage with the knife in place therein, Fig. 6 is a top plan view thereof, Fig. 7 is a bottom plan view thereof, Fig. 8 is a transverse fragmentary sectional view on a larger scale, taken on line 8—8 of Fig. 5, Fig. 9 is a transverse sectional view on a larger scale taken on line 9—9 of Fig. 2, and Fig. 10 is a detailed perspective view showing the cutting operation.

Referring now to the drawings, the device may comprise a simple unit suitably mounted on the counter or table of a retail store. The frame comprises a back wall 11 and side walls 12 upon the oblique upper edges of which is supported a measuring platform 13 which desirably has inch or centimeter scales 14 along one or both lateral edges thereof. In ordinary practice, the platform is of a length to measure off one-half yard of the oil cloth or other sheet material. Mounted on back of the rear wall 11 near the top thereof is a cradle 15 which may be of wood or metal for removably housing the roll 16 of oil cloth selected by the customer.

Immediately in front of the cradle and under the upper edge of the measuring platform is a narrow shelf 17 which desirably rests at its edge upon the back wall 11 and which extends the entire width of the apparatus. Upon that shelf and against the rear edge of the measuring platform is affixed the base 18 of a knife-carrying track 19, the top of which is nearly flush with the face of said platform. The knife track extends well beyond at least one and preferably beyond both of the lateral edges of the measuring platform as shown at 20, for normally accommodating the knife carriage C beyond the width of oil cloth being measured off, so that after such measuring has been completed, the knife carriage may then be propelled along the track to sever the oil cloth.

Preferably the knife track comprises a narrow deep channel of sheet metal having a narrow base 21 and uprising side walls 22 and inturned lips 23 which serve to key the knife carriage in place, as will appear hereinafter.

The knife carriage preferably comprises blade holder portions 24, removably clamping in place a knife blade 25 for its cutting edge 26 to extend obliquely upward and forward in the cutting direction, as appears best in Fig. 10, the knife carriage being gripped as shown in said Fig. 10 by grasping the outwardly flaring finger grip edges 27 thereof.

In the specific construction shown, the knife carriage comprises a pair of sheet metal stampings of similar shape which are clamped together by bolt 28 therethrough having nut 29, said bolt extending through the central aperture 30 in the blade 25 clamped therebetween. Each of these carriage plates preferably includes a lower or chassis strap 31 from which rises leg 32 unitary with the upper or blade holder portion 24. The latter has a horizontal lower edge 33 defining the upper edge of a slot or gate 34 between the chassis strap 31 and the knife clamping plate 24, said strap 31 being narrower at its inner root to widen the gate thereat as at 35, thereby to expose the effective length of cutting edge 36 which extends obliquely upward and forward across the gate as shown. Effectively to position the knife blade against rocking, it is preferred to use a blade of the safety razor type with two small holes 36 laterally of the center hole 30 and into which are keyed embossments 37 on the respective clamping plates.

The chassis straps 31 have inturned forward toes 38 which abut as shown in Figs. 6 and 7, and these straps are inturned at 39 toward each other for direct engagement at their inner ends, from which rise the legs 32 that support the respective blade holder plates 24. The plates making up the blade holder plates 24 define a thickness greater than the opening between the lips 23 of the blade track, so that the blade carriage may be effectively keyed within the track without possibility of coming out in use. To maintain the uniform thickness of the chassis, the superposed roots 40 of the chassis straps have embossments 41 defining a thickness corresponding to that of the main length of chassis.

Preferably the end portions of the track are closed by a removable bolt 42 held by nut 43 to permit admission of the chassis of the knife carriage into the track. Upon its replacement, the bolt serves as an end stop for the knife.

In use, the sales person, after depositing the roll of oil cloth 16 or the like in the cradle 15, pulls the cloth forward until its edge touches the forward edge 44 of the platform thereby measuring out a half yard in the example illustratively shown. Thereupon grasping the oil cloth at the track portion 19, she readily pushes it forward until her finger again reaches the forward edge 44, thereby advancing another half yard of material. In this manner, she can measure off the required order in half yard steps. Thereupon, she grasps the knife carriage at its finger holds 27 and simply pulls or pushes it along the knife track 19 as best shown in Fig. 10. In this operation, the forwardly and obliquely extending blade edge 26 shears through the oil cloth, the knife carriage which fits loosely in the knife track, floating in the cutting operation and this without likelihood of jamming or catching or cutting of the fingers.

The device is thus simple and self-contained. It dispenses with the need to grope for separate measuring tapes or rules or cutting implements. The operation is expeditious and reliable.

As many changes could be made in the above construction and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A device for measuring and severing sheet material, comprising a cradle for a roll of the material, a measuring platform inclined forwardly and downwardly from in front of said cradle, a stationary knife track interposed between the cradle and the platform, a knife carried in and slidable along said track and means for accommodating the knife out of the path of the material beyond a lateral edge thereof during the measuring operation.

2. A device for measuring and severing sheet material from a roll, comprising a frame having a roll carrying cradle thereon, a measuring platform inclined forwardly and downwardly from in front of said cradle, a stationary knife track extending along the rear edge and below the surface of said platform and across the entire width thereof, said track having a knife carriage riding therein and mounting a knife blade with an oblique cutting edge protruding above the track and the sheet to be cut, said track having a portion protruding beyond the platform and accommodating the knife during the measuring operation.

3. A device for measuring and severing sheet material from a roll, comprising a frame having a vertical wall, a roll carrying cradle mounted on the back of said wall at the upper part thereof, a narrow shelf in front of said cradle, measuring platform inclined forwardly and downwardly from said shelf, a stationary knife track extending the entire width of said platform and protruding therebeyond at one end thereof, the surface of said platform extending above said knife track, a knife carriage supported in said track for movement therealong and normally resting in said protruding end of the track, said knife carriage carrying a blade protruding obliquely above the track.

4. A device for measuring out and severing lengths of sheet material from a roll, comprising a frame having a roll carrying cradle at its rear, a measuring platform inclined forwardly and downwardly from in front of the cradle and a stationary knife track extending transversely of the device between the cradle and the platform, and protruding beyond the platform at one end thereof and a knife carriage mounted in said track, normally in the protruding end thereof, said carriage having an upwardly extending finger grip portion for propelling the same along the track, said carriage also having blade clamp means for retaining a blade in inclined position near said finger grip portion.

5. A knife carriage of the character described, comprising a pair of plates each having a horizontal slot therein and defining a chassis strap below the slot and a blade clamping and manipulating portion above the slot, a knife blade having a central and two lateral openings, a bolt through the central opening for clamping the knife between the two plates and embossments extending inward from the plates into the lateral blade opening to position the blade with its cutting edge extending obliquely across the slot.

6. The combination recited in claim 5 in which the outer portion of the knife gripping portions flare outward as finger grips.

7. The combination recited in claim 5 in which the chassis straps are bent inward at their free ends for determining the thickness thereof to be effectively keyed into the knife track.

RUSH H. KRESS.